May 2, 1933. R. B. HUNTER 1,906,859
APPARATUS FOR CONTROLLING CONTINUITY OF CIRCUIT AND ILLUMINATION
INTENSITIES OF GROUPS OF ELECTRIC LAMPS
Filed Oct. 11, 1930 2 Sheets-Sheet 2

Fig. 2

Inventor
Richard B. Hunter
By Frank H. Hubbard
Attorney

Patented May 2, 1933

1,906,859

UNITED STATES PATENT OFFICE

RICHARD B. HUNTER, OF SHOREWOOD, WISCONSIN, ASSIGNOR TO CUTLER-HAMMER, INC., OF MILWAUKEE, WISCONSIN, A CORPORATION OF DELAWARE

APPARATUS FOR CONTROLLING CONTINUITY OF CIRCUIT AND ILLUMINATION INTENSITIES OF GROUPS OF ELECTRIC LAMPS

Application filed October 11, 1930. Serial No. 488,185.

This invention relates to improvements in apparatus for controlling continuity of circuit and illumination intensities of groups of electric lamps.

An object of the invention is to provide simplified apparatus of the aforementioned character.

Another object is to provide novel means whereby energization and illumination intensities of a plurality of groups of lamps may be preselected, whereupon the preselected illumination effect of the groups of lamps jointly may be enacted automatically.

Another object is to provide a system embodying an individual current control instrumentality for the circuit of each of a plurality of groups of lamps, together with means operable automatically to effect joint operation of said control instrumentalities, under conditions of individual automatic control of the latter.

Another object is to provide an illumination control system the various elements of which are readily adjustable to provide a substantially unlimited number of illumination intensity and/or lighting effects.

Other objects and advantages of the invention will hereinafter appear.

The accompanying drawings illustrate an embodiment of the invention which will now be described, it being understood that the embodiment illustrated is susceptible of modification without departing from the scope of the appended claims.

Figure 1:
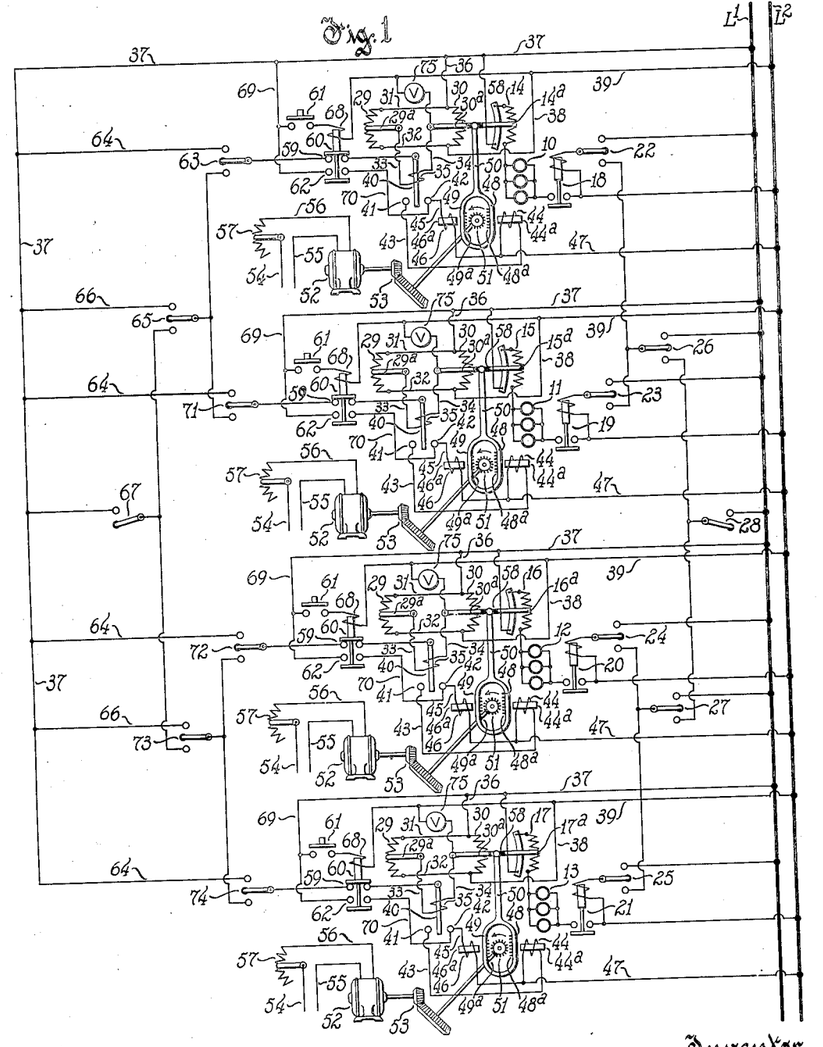
Figure 1 illustrates schematically and diagrammatically an illumination control system constructed in accordance with my invention.

Referring to Fig. 1, the numerals 10, 11, 12 and 13, respectively, designate groups of incandescent electric lamps such as are commonly used for illuminating purposes in theaters, auditoriums and the like. While I have shown only three lamps in each group, it is to be understood that a larger number of lamps will ordinarily be included in each group. Also it is to be understood that the lamps in each particular group will ordinarily be of like color, but in order to obtain the desired lighting effects it is preferred to employ lamps in certain groups which differ in color from the lamps of other groups. For instance, it may be assumed that the lamps in group 10 represent the white foot-lights, and those in group 11 the white border lights, of a stage; whereas the lamps in group 12 may represent the red foot-lights, and those in group 13 the red border lights, of such stage. As will be apparent from the following description, the number of groups of lamps and the colors of the lamps employed may be varied as desired to meet the requirements of each particular installation.

Included in circuit with each group of lamps is a suitable current controlling or regulating device, such as the dimmer rheostats designated respectively by the numerals 14, 15, 16 and 17. As will be apparent to those skilled in the art similar or equivalent regulating devices may be substituted for the dimmer rheostats illustrated,—as, for instance, electron tubes with grid control, or magnetic amplifier type dimmers in which the current in the direct current coils is varied.

Normally open electromagnetically operated switches 18, 19, 20 and 21 are also included in circuit with the respective groups of lamps,—single-pole double-throw selector switches 22, 23, 24 and 25 being provided, and each being adapted in its upper position to directly connect the operating winding of its associated electromagnetically operated switch across lines $L^1$ and $L^2$,— switches 22 and 23 being adapted in the lower positions thereof to relay control of the energizing circuits of the windings of switches 18 and 19 to a single-pole double-throw color master switch 26, and switches 24 and 25 being adapted in the lower positions thereof to relay control of the energizing circuits of the windings of switches 20 and 21 to a second color master switch 27. Switches 26 and 27 in the upper positions thereof connect directly with line L¹, whereas said switches in their lower positions relay control to a grand master switch 28, which is preferably of the single-pole single-throw type.

As aforeindicated each of the switches 22 to 27, inclusive, is movable selectively to an upper or lower on position or to an intermediate off position,—the grand master switch being movable selectively to its on or its off position. When control of certain or all of the aforementioned electromagnetically operated switches is to be relayed to the color master switches 26, 27, the switches 22, 23, 24, 25 are moved to their lower on positions, and if control is to be further relayed to grand master switch 28 the color master switches 26, 27 are moved to their lower on positions. It will thus be apparent that the circuit of each group of lamps is subject to individual continuity control by switches 22 to 25 under all conditions, and that the groups of lamps 10, 11 of a given color may be controlled jointly by switch 26, independently of the groups of lamps 12, 13 of a different color,—the latter being capable of joint control by switch 27,—all of the groups 10, 11, 12 and 13 being controllable jointly at will by the grand master switch 28.

Assuming energization and closure of all of the switches 18 to 21, inclusive, the circuits of all of the groups of lamps 10 to 13, inclusive, will be completed,—the intensity of illumination of the lamps in each group being dependent upon the respective positions of the contact arms 14ᵃ to 17ᵃ, inclusive, of the dimmer rheostats. Each of said contact arms is shown in an intermediate or mid-position, which may be assumed to provide for half-bright illumination intensity of the respective groups of lamps,—it being understood that when said contact arms are in their lower extreme positions full-bright illumination intensity of the respective groups will be provided,—whereas when said contact arms are in their upper extreme positions full-dark or zero illumination intensity of the respective groups will be provided without requiring positive or actual interruption of the lamp circuits.

Means are associated with each group of lamps to provide for movement or adjustment of the aforementioned rheostat contact arms 14ᵃ to 17ᵃ, inclusive, automatically from any given position or positions thereof to any other preselected position or positions,—the position to be assumed by each rheostat contact arm being preselectable individually, and initiation or enactment of the change or changes required in the positioning of the respective contact arms being subject to control either individually and independently of each other, or jointly for groups of lamps of corresponding color, or jointly for all groups of lamps irrespective of differences in color.

The aforementioned automatically operable control means for each rheostat comprises essentially a sending rheostat 29 and a receiving rheostat 30 of suitable form,—the adjacent ends of said rheostats being electrically connected with each other, as by means of the conductors 31 and 32. Rheostat 29 is provided with a manually adjustable arm 29ᵃ and rheostat 30 is provided with a power-operated arm 30ᵃ,—the pivoted ends of said arms being electrically connected by conductors 33 and 34 with opposite ends of the coil 35 of a polarized relay of well-known form. Conductor 31 is connected to line L¹ by conductors 36 and 37 and conductor 32 is connected to line L² by conductors 38 and 39.

Rheostats 29 and 30 and coil 35 are thus arranged in the form of a Wheatstone bridge, so that upon corresponding positioning of rheostat arms 29ᵃ and 30ᵃ, as shown, the bridge circuit will be balanced and substantially no current will flow in either direction through the coil 35. On the other hand, upon movement of arm 29ᵃ in either direction from the position illustrated the bridge circuit will be unbalanced and current will flow through the coil 35 in one direction or the other (depending upon the direction in which arm 29ᵃ was moved and/or the position of arm 30ᵃ at that instant).

Moreover, the bridge will remain in an unbalanced condition until the arm 30ᵃ is moved in a like direction (with respect to arm 29ᵃ) to a corresponding position thereof which will effect re-balancing of the bridge circuit. The aforedescribed characteristics of the bridge-circuit are utilized to effect movement of the contactor 40 of the polarized relay into engagement with the contact 41 or the contact 42 (depending upon the direction of the current through coil 35).

Contact 41 is connected by conductor 43 with one end of a solenoid coil 44 and contact 42 is connected by conductor 45 with one end of a solenoid coil 46,—the other ends of said coils being connected by conductor 47 with line L². The coils 44 and 46 are respectively provided with fixed cores 44ᵃ and 46ᵃ. Interposed between the adjacent ends of cores 44ᵃ and 46ᵃ are the spaced arms 48 and 49 of a double rack member 50, said arms having teeth 48ᵃ, 49ᵃ on the inner faces thereof for selective engagement with a pinion 51.

Pinion 51 is adapted to be constantly driven in the direction indicated by the arrow by means of a suitable relatively small motor 52 which is connected thereto through the medium of suitable gearing, such as indicated at 53. Motor 52 is connected, by means of conductors 54, 55 and 56 with a suitable source of supply (as, for instance, lines L¹, L²),—a rheostat 57 of well known form being preferably included in the circuit of the motor whereby the speed of the latter may be varied at will.

The rack member 50 is normally biased to an intermediate position out of engagement with pinion 51, as by suitable spring means (not shown), and the upper end of said member is pivotally engaged with and supported by an insulating member or portion 58 which also acts to rigidly unite the arms 14ª and 30ª of rheostats 14 and 30, respectively. By this arrangement any movement of arm 30ª with respect to the resistor of rheostat 30 results in a like or proportional movement of arm 14ª with respect to the resistor of rheostat 14. Obviously the rheostats 30 and 14 might be arranged in side by side relationship to each other if desired.

Included in circuit in series with the movable contactor 40 of the polarized relay are a set of normally closed contacts 59 controlled by an electromagnetically operated relay 60,—said relay having an operating winding to be controlled by a normally open push button switch 61, and said relay 60 having a set of normally open contacts 62 for a purpose to be later described.

Contacts 59 are connected with the movable contactor of a single-pole double-throw switch 63,—said switch having an upper on position whereby the contactor 40 of the polarized relay is connected individually, through conductors 64 and 37, to line L¹,—said switch also having an intermediate off position, and a lower on position whereby control of the circuit of contactor 40 of the polarized relay is relayed to the color master switch 65. Switch 65 is likewise of the single-pole double-throw type, having an upper on position whereby the same connects through conductors 66 and 37 to line L¹,—said switch also having an intermediate off position, and a lower on position whereby control of the circuit of contactor 40 is further relayed to the grand master switch 67. Switch 67, as shown, is preferably of the single-pole single-throw type.

In certain instances it is desirable that the lamps of the respective groups may be quickly darkened, or the intensity of illumination thereof reduced to zero value, irrespective of the position of arms 29ª of sending rheostats 29 or the instantaneous position of arms 14ª, 15ª, etc., of dimmer rheostats 14, 15, etc. This feature is provided by means of the individually operable push button switches 61,—each of which when depressed is adapted to complete an energizing circuit for the coil 68 of its associated relay 60, thus opening the normally closed contacts 59 of the latter to disconnect contactor 40 of the polarized relay from line L¹, and providing, through closure of the normally open contacts 62, an energizing circuit for the coil 46 of the ratcheting mechanism.

The circuit last mentioned may be traced from line L¹ by conductors 37 and 69 through said contacts 62, by conductors 70 and 45 through the coil 46, and by conductor 47 to line L². The teeth 48ª are thus drawn to the left into engagement with pinion 51, whereby the arm 14ª is driven toward its upper extreme position to include all of the resistance of rheostat 14 in circuit in series with the group of lamps 10. The rack teeth are arranged as shown to ride out of engagement with pinion 51, and thus limit the upward movement of the dimmer rheostat arm 14ª under these conditions; or any other suitable form of limiting means may be provided.

While I have shown individually operable push button switches 61, it is to be understood that suitable means may be provided for mechanically interconnecting these switches, or other suitable electrical control means may be provided, to effect joint energization of all or certain of the coils 68 by a single control instrumentality.

Where the refinement last described is not required the push-button switches 61 and the electromagnetically operated switches 60 controlled thereby may be omitted, inasmuch as the other elements provide for attainment of a similar result by simply moving the arms 29ª of the sending rheostats 29 to their upper extreme positions, respectively. In this case, however, there may be a slight delay in initiation of the upward movement of the dimmer rheostat arms 14ª, etc., due to the time element involved in such upward movement of the sending rheostat arms 29ª, and the time element of response of the respective polarized relays.

While I have described in detail the construction and operation of the control elements individual to the group of lamps 10, it is to be understood that the control elements individual to the groups of lamps 11, 12 and 13 may be identical with those aforedescribed and (with the exception of the dimmer rheostats 15, 15ª, 16, 16ª and 17, 17ª) are given like numerals of reference.

In this connection it is to be noted that an individual single-pole double-throw selector switch 71 is associated with the control elements for the group of lamps 11, said switch being adapted in its upper on position to connect the contactor 40 of its associated polarized relay directly to line L¹, and adapted in its lower on position to relay control of such contactor circuit to color master switch 65. Similarly, the individual selector switch 72 is adapted in its upper on position to connect the contactor 40 of the polarized relay associated with the group of lamps 12 directly to line L¹, and adapted in its lower on position to relay control of such contactor circuit to color master switch 73. The individual selector switch 74 is likewise adapted in its upper on position to connect the contactor of the polarized relay associated with the group of lamps 13 directly to line L¹, and adapted in its lower on position to relay control of such contactor circuit to color master switch 73.

Color master switch 73 (like color master switch 65) is adapted in its upper on position to connect with line L¹ through conductors 66 and 37, and adapted in its lower on position to relay control to the grand master switch 67.

Associated with each Wheatstone bridge circuit and connected between the conductor 39 leading from line L² and the arm 30ª of each receiving or follow-up rheostat is a voltmeter 75,—said voltmeters each being suitably calibrated to indicate directly the relative positions of the arms 30ª, and hence the degrees of illumination intensity provided by the instantaneous positions of the arms 14ª, 15ª, etc. of the dimmer rheostats.

I will now indicate certain modes of operating the system hereinabove described. Assume, for purposes of illustration, that the illumination effect for a given scene is to be initiated with each of the groups of lamps 10 to 13, inclusive, at half-bright intensity, as indicated by the intermediate positioning of the arms 14ª to 17ª, inclusive, of the dimmer rheostats. Also assume that the intensity of illumination of groups 10 and 11 is to be decreased gradually to dark out or zero value while the intensity of illumination of groups 12 and 13 is to be increased gradually to full bright or maximum value. For this purpose the arms 29ª of the sending rheostats associated with groups 10 and 11 would be moved to their upper extreme positions, and the arms 29ª of the sending rheostats associated with groups 12 and 13 would be moved to their lower extreme positions.

Switches 22 and 25, inclusive, would also be moved to their lower on positions to relay control to the color master switches 26 and 27, and the switches 26 and 27 would be moved to their lower on positions to relay control to grand master switch 28,—the switch 28 being left open temporarily so that the same may be closed simultaneously with closure of the grand master switch 67, as hereinafter described.

It is to be understood that the aforementioned adjustments of the arms 29ª of the respective sending rheostats will immediately result in unbalancing of the several Wheatstone bridge circuits, so that the contactors 40 of the polarized relays associated with groups 10 and 11 will be brought into engagement with the contacts 42, and the contactors 40 of the polarized relays associated with groups 12 and 13 will be brought into engagement with the contacts 41. However, the polarized relay contacts cannot function to complete circuit for any of the coils 44, 46 of the ratcheting mechanisms until the respective contactors 40 have been connected with line L¹.

Accordingly the switches 63, 71 and 72, 74 may be moved to their lower on positions to relay control to the color master switches 65 and 73, respectively; and switches 65 and 73 may be moved to their lower on positions to relay control to grand master switch 67. With the various parts thus pre-set, the grand master switches 28 and 67 may be closed simultaneously, whereby the electromagnetically operable switches 18 to 21, inclusive, are closed simultaneously to complete the circuits of the respective groups of lamps, and the rack and pinion mechanisms then function automatically to effect gradual movement of the arms 14ª to 17ª of the dimmer rheostats to the respective positions preselected therefor by the settings of the arms 29ª of the sending rheostats.

As will be apparent, the rheostats 57 in the circuits of the individual driving motors 52 may be adjusted to provide for operation of the latter at like or different speeds, so that the rates of change from the obtaining intensities of the respective groups of lamps to the intensities preselected therefor may likewise be preselected as desired.

In this connection it may be observed that other forms of driving means for the rack and pinion mechanisms may be employed if desired. Thus the rack and pinion mechanisms may be connected in groups of two or more to a common driving motor, or all of such mechanisms may be connected for driving thereof by a single motor,—the modified arrangements being somewhat less flexible than the combination illustrated, unless suitable change-speed mechanism is interposed between such rack and pinion mechanisms and the means for jointly driving the same. In like manner it will be understood that reversible motors may be substituted for the continuously operated motors 52, such reversible motors being directly or indirectly controllable by the contacts of the respective polarized relays, whereby the rack and pinion mechanisms may be omitted.

When the groups of lamps have been brought to the intensities preselected therefor in the manner aforedescribed, obviously the sending rheostats may be immediately utilized to preselect the illumination intensities of the respective groups of lamps for the next scene or illumination effect by merely disabling temporarily the movable contactors of the polarized relays associated therewith. This may be accomplished by opening the grand master switch 67 and then adjusting the arms 29ª of the sending rheostats individually in the manner aforedescribed.

A change from the existing illumination effect to that last preselected may be enacted by merely reclosing the grand master switch 67, thus providing for a gradual change. On the other hand, the grand master switch 28 may be opened to extinguish the lamps of all groups (with the curtain up or down as desired) and the grand master switch 67 may be closed to effect movement of the dimmer rheostat arms 14ª, etc. to the positions preselected therefor prior to reclosure of the grand master switch 28, whereby the illumination effect preselected may be enacted instantaneously. Or, preferably with the grand master switch 28 opened, the switches 61 may be closed individually (or jointly in the manner hereinbefore suggested) to bring any or all of the dimmer rheostat arms 14ª to dark out position, so that upon simultaneous reclosure of grand master switches 28 and 67 the groups of lamps will gradually change from dark out to the respective intensities of illumination preselected therefor by adjustment of the sending rheostat arms, as aforedescribed.

When control of the circuits of the contactors 40 of the polarized relays has been relayed only to the color master switches 65 and 73, the latter must both be moved downwardly to their intermediate off positions to temporarily disable such movable contactors 40; and when such contactors have been directly connected to line L¹ by the individual selector switches 63, 71, 72 and 74 each of the latter must be moved downwardly to its intermediate off position to temporarily disable the contactors. As an alternative of the operation last described suitable means may be provided for jointly disabling the several bridge circuits themselves, such means (not shown) being preferably arranged to interrupt at will the circuit through each of the conductors 31, 32 of the respective bridge circuits,—such means being adapted to permit retention of the receiving rheostats 30 in circuit, so that the voltmeters 75 will be at all times effective to indicate the position of the arms 14ª, 15ª, etc. of the respective dimmer rheostats.

The manner of obtaining various other combinations of the lighting circuits and the illumination intensities thereof either individually or jointly will be apparent to those skilled in the art without further explanation. It may be noted again, however, that any one of the groups of lamps may be rendered active or inactive depending upon the position of the individual selector switches 22 to 25, inclusive, and/or the position of the switches 26 to 28, inclusive, associated therewith; and the illumination intensity varying elements for the respective groups of lamps may be rendered active or inactive depending upon the position of the individual selector switches 63, 71, 72 and 74, and/or the switches 65, 73 and 67 associated therewith.

Figure 2:
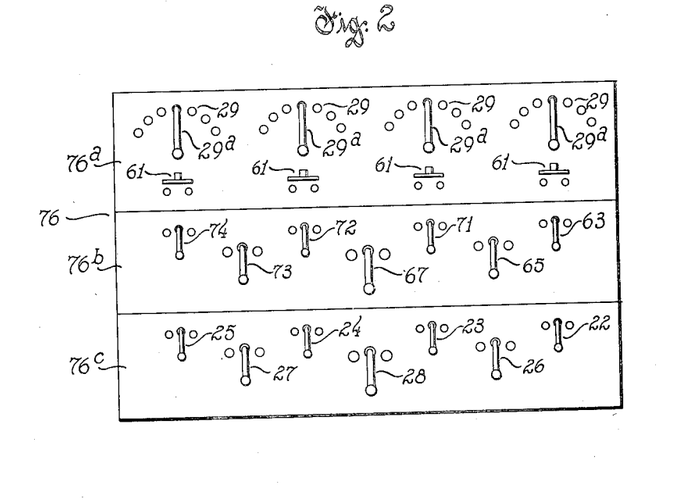
Fig. 2 is a front elevation of the control board or panel for the control system illustrated in Fig. 1.

As shown in Fig. 2 the operating handles of the several sending rheostats and the various manually operable switches may be compactly arranged in convenient relationship to each other upon a suitable panel 76 which may consist of a number of sections 76ª, 76ᵇ and 76ᶜ. Also if desired suitable legends or indicia (not shown) may be provided upon the panel to indicate the relative positions of the several elements of the control system.

What I claim as new and desire to secure by Letters Patent is:

1. In an illumination control system, in combination, a lamp circuit, circuit continuity and intensity control elements therefor, and current regulating means for said lamp circuit to be preset for delayed action subject to control by said intensity control element, said current regulating means comprising a sending rheostat, a follow-up receiving rheostat, means for connecting said rheostats in the form of a Wheatstone bridge, and means to effect a continuous and gradual current change in said lamp circuit varying with the follow-up movement required of said receiving rheostat incident to balancing of said bridge.

2. In an illumination control system, in combination, a plurality of lamp circuits, individual intensity control elements therefor, individual current regulating means for said lamp circuits to be preset for delayed action subject to control by said intensity control elements respectively, each of said current regulating means including a sending rheostat and a receiving rheostat arranged in the form of a Wheatstone bridge, and means controlled by said Wheatstone bridge whereby the delayed current change is effected gradually, and means associated with said intensity control elements to afford optional joint control of the regulating means for a plurality of said lamp circuits.

3. In an illumination control system, in combination, a plurality of lamp circuits, individual circuit continuity and intensity control elements therefor, individual current regulating means for said lamp circuits to be preset for action subject to control by said intensity control elements respectively, each of said current regulating means comprising a sending rheostat, a follow-up receiving rheostat, means to effect a current change in the respective lamp circuit varying with the follow-up movement required of the receiving rheostat, and means respectively associated with said circuit continuity and intensity control elements to afford optional joint control of continuity and current changes for a plurality of said lamp circuits.

4. In an illumination control system, in combination, a plurality of lamp circuits, individual current regulating means therefor operable independently of one another, each of said regulating means including automatic means to effect gradual change of the current in the respective lamp circuit and further including means to be preset for varying the gradual change to be effected, and means affording control of said lamp circuits either individually or jointly for continuity of circuit and for delayed action of their respective regulating means.

5. In an illumination control system, in combination, a plurality of lamp circuits, individual current regulating means therefor operable independently of one another, each of said regulating means including a Wheatstone bridge circuit, means operable in response to unbalancing of said bridge circuit to effect gradual change of the current in the respective lamp circuit and further including means to be preset for varying the gradual change to be effected, and means affording control of said lamp circuits individually or certain collectively for continuity of circuit and for delayed action of their respective regulating means.

6. In an illumination control system, in combination, a plurality of lamp circuits, individual current regulating means therefor operable independently of one another, each of said regulating means including automatic means to effect gradual change of the current in the respective lamp circuit and further including means to be preset for varying the gradual change to be effected, separate controllers associated with each of said lamp circuits to afford circuit continuity control therefor and delayed action of the respective regulating means, and master controllers associated with the aforementioned controllers to afford in respect of a plurality of said circuits continuity control and delayed action of their regulating means.

7. In an illumination control system, in combination, a group or bank of electric lamps and circuit controlling means therefor, illumination intensity regulating means included in circuit with said group of lamps, and means for effecting adjustment of said regulating means, said last mentioned means comprising a sending rheostat, a receiving rheostat and a polarized relay coil arranged in the form of a Wheatstone bridge, said sending rheostat being movable at will to effect unbalancing of said bridge, means associated with said relay coil for effecting movement of said receiving rheostat to gradually re-balance said bridge, and means for causing said regulating means to simulate the action of said receiving rheostat, whereby said sending rheostat may be utilized to preselect the intensity of illumination of said lamps.

8. In an illumination control system, in combination, a group or bank of electric lamps and circuit controlling means therefor, illumination intensity regulating means included in circuit with said group of lamps, and means for effecting adjustment of said regulating means, said last mentioned means comprising a sending element, a receiving element and a polarized relay coil arranged in the form of a Wheatstone bridge, said sending element being movable at will to effect unbalancing of said bridge, means associated with said relay coil for effecting movement of said receiving element to gradually re-balance said bridge, means for causing said regulating means to simulate the action of said receiving element, whereby said sending element may be utilized to preselect the intensity of illumination of said lamps. and means operable at will to disable the means associated with said relay coil, whereby said sending element may be further utilized to preselect a different illumination intensity effect during enactment of the illumination intensity effect first preselected.

9. In an illumination control system, in combination, a group or bank of electric lamps and circuit controlling means therefor, illumination intensity regulating means included in circuit with said group of lamps, and means for effecting adjustment of said regulating means, said last mentioned means comprising a sending element, a receiving element and a polarized relay coil arranged in the form of a Wheatstone bridge, said sending element being movable at will to effect unbalancing of said bridge, means associated with said relay coil for effecting movement of said receiving element to gradually re-balance said bridge, means for causing said regulating means to simulate the action of said receiving element, whereby said sending element may be utilized to preselect the intensity of illumination of said lamps, means operable at will to disable the means associated with said relay coil, whereby said sending element may be further utilized to preselect a different illumination intensity effect during enactment of the illumination intensity effect first preselected, and electrical means operable at will independently of said sending element and said relay for minimizing the illumination intensity effect of said group of lamps while maintaining the circuit connections of the latter.

10. In an illumination control system, in combination, a plurality of groups of electric lamps, each group of lamps having means individual thereto for regulating the intensity of illumination thereof, means for relaying intensity regulating control from said individual means to color master and grand master control instrumentalities selectively, each of said intensity regulating means comprising a Wheatstone bridge circuit having a part thereof operable at will to preselect a given intensity of illumination of the group of lamps controlled thereby, and associated means operable automatically for gradually changing from the obtaining intensity of illumination of such group to the intensity of illumination preselected therefor.

11. In an illumination control system, in combination, a plurality of groups of electric lamps, each group of lamps having means individual thereto for controlling continuity of the circuit thereof and means individual thereto for regulating the intensity of illumination thereof, means for relaying circuit continuity and intensity regulating control from said individual means to color master and grand master control instrumentalities selectively, each of said intensity regulating a Wheatstone bridge circuit having a part thereof comprising means operable at will to preselect a given intensity of illumination of the group of lamps controlled thereby, and associated means operable automatically for gradually changing from the obtaining intensity of illumination of such group to the intensity of illumination preselected therefor.

12. In an illumination control system, in combination, a plurality of groups of electric lamps, each group of lamps having means individual thereto for regulating the intensity of illumination thereof, means for relaying intensity regulating control from said individual means to color master and grand master control instrumentalities selectively, each of said intensity regulating means comprising a Wheatstone bridge circuit having a part thereof operable at will to preselect a given intensity of illumination of the group of lamps controlled thereby associated means operable automatically for gradually changing from the obtaining intensity of illumination of such group to the intensity of illumination preselected therefor, and means individually regulable at will for varying the rates of change of the respective groups of lamps from the obtaining intensities of illumination to the intensities of illumination preselected therefor.

13. In an illumination control system, in combination, a plurality of groups of electric lamps, each group of lamps having means individual thereto for controlling continuity of the circuit thereof and means individual thereto for regulating the intensity of illumination thereof, means for relaying circuit continuity and intensity regulating control from said individual means to color master and grand master control instrumentalities selectively, each of said intensity regulating means comprising a Wheatstone bridge circuit having a part thereof operable at will to preselect a given intensity of illumination of the group of lamps controlled thereby, associated means operable automatically for gradually changing from the obtaining intensity of illumination of such group to the intensity of illumination preselected therefor, and means individually regulable at will for varying the rates of change of the respective groups of lamps from the obtaining intensities of illumination to the intensities of illumination preselected therefor.

14. In an illumination control system, in combination, a group or bank of electric lamps and circuit controlling means therefor, illumination intensity regulating means included in circuit with said group of lamps, and means for effecting adjustment of said regulating means, said last mentioned means comprising a sending rheostat, a receiving rheostat and a polarized relay coil arranged in the form of a Wheatstone bridge, said sending rheostat being movable at will to effect unbalancing of said bridge, means associated with said relay coil for effecting movement of said receiving rheostat to gradually re-balance said bridge, means for causing said regulating means to simulate the action of said receiving rheostat, whereby said sending rheostat may be utilized to preselect the intensity of illumination of said lamps, and means responsive to an electrical condition of said bridge circuit for indicating the position of a part of said receiving rheostat.

15. In an illumination control system, in combination, a group or bank of electric lamps and circuit controlling means therefor, illumination intensity regulating means included in circuit with said group of lamps, and means for effecting adjustment of said regulating means, said last mentioned means comprising a sending rheostat, a receiving rheostat and a polarized relay coil arranged in the form of a Wheatstone bridge, said sending rheostat being movable at will to effect unbalancing of said bridge, means associated with said relay coil for effecting movement of said receiving rheostat to gradually re-balance said bridge, means for causing said regulating means to simulate the action of said receiving rheostat, whereby said sending rheostat may be utilized to preselect the intensity of illumination of said lamps, and means responsive to an electrical condition of said bridge circuit for indicating the position of a part of said regulating means, said indicating means comprising a voltmeter connected across a portion of said bridge circuit.

16. In an illumination control system, in combination, a group of electric lamps and means for completeing an energizing circuit therefor, adjustable means included in said circuit for controlling the intensity of illumination of said lamps, and means operable independently of said first-mentioned means for effecting adjustment of said adjustable means, said last-mentioned means comprising a pair of resistors and a polarized relay coil arranged in the form of a Wheatstone bridge, means associated with one of said resistors for effecting a predetermined degree of unbalancing of said bridge, and means including contacts controlled by said relay coil and cooperating means associated with the other of said resistors for gradually balancing said bridge.

17. In an illumination control system, in combination, a group of electric lamps and means for completing an energizing circuit therefor, adjustable means included in said circuit for controlling the intensity of illumination of said lamps, and means operable independently of said first-mentioned means for effecting adjustment of said adjustable means, said last-mentioned means comprising a pair of resistors and a polarized relay coil arranged in the form of a Wheatstone bridge, means associated with one of said resistors for effecting a predetermined degree of unbalancing of said bridge, and means including contacts controlled by said relay coil and cooperating means associated with the other of said resistors for gradually balancing said bridge, said adjustable means being arranged to simulate the action of said cooperating means, whereby said first-mentioned resistor and its associated parts may be utilized to pre-select the intensity of illumination of said lamps.

18. In an illumination control system, in combination, a group of electric lamps and means for completing an energizing circuit therefor, adjustable means included in said circuit for controlling the intensity of illumination of said lamps, and means for effecting adjustment of said adjustable means, said last-mentioned means comprising a pair of resistors and a polarized relay coil arranged in the form of a Wheatstone bridge, means associated with one of said resistors for effecting a predetermined degree of unbalancing of said bridge, means including contacts controlled by said relay coil and cooperating means associated with the other of said resistors for gradually balancing said bridge, said adjustable means being arranged to simulate the action of said cooperating means, whereby said first-mentioned resistor and its associated parts may be utilized to pre-select the intensity of illumination of said lamps, and means for rendering the polarized relay contacts effective or ineffective for balancing said bridge independently of the means for completing the energizing circuit of said lamps.

19. In an illumination control system, in combination, a group of electric lamps and means for completing an energizing circuit therefor, adjustable means included in said circuit for controlling the intensity of illumination of said lamps, and means for effecting adjustment of said adjustable means, said last-mentioned means comprising a pair of resistors and a polarized relay coil arranged in the form of a Wheatstone bridge, means associated with one of said resistors for effecting a predetermined degree of unbalancing of said bridge, means including contacts controlled by said relay coil and cooperating means associated with the other of said resistors for gradually balancing said bridge, said adjustable means being arranged to simulate the action of said cooperating means, whereby said first-mentioned resistor and its associated parts may be utilized to pre-select the intensity of illumination of said lamps, means for rendering the polarized relay contacts effective or ineffective for balancing said bridge independently of the means for completing the energizing circuit of said lamps, and means for providing a predetermined intensity of illumination of said lamps irrespective of the balanced or unbalanced condition of said bridge.

20. In an illumination control system, in combination, a group of electric lamps, current control means operable automatically to gradually vary the intensity of illumination of said group of lamps, and means associated with said current control means to control the rate and duration of operation of the latter, said last mentioned means including means operable at will to preselect any desired rate of change of illumination intensity of said group of lamps regardless of the total change to be effected.

21. In an illumination control system, in combination, a plurality of groups of electric lamps, each of said groups of lamps having current control means individual thereto, each of said control means being operable automatically to gradually vary the intensity of illumination of the group of lamps associated therewith, and means associated with the respective current control means to selectively control the rate or rates and duration of operation of the latter, said last mentioned means including means operable at will to preselect any desired rate or rates of change of illumination intensity of the respective groups of lamps regardless of the total change or changes to be effected.

In witness whereof, I have hereunto subscribed my name.

RICHARD B. HUNTER.

CERTIFICATE OF CORRECTION.

Patent No. 1,906,859. May 2, 1933.

RICHARD B. HUNTER.

It is hereby certified that error appears in the printed specification of the above numbered patent requiring correction as follows: Page 4, line 58, for "and" read to; page 7, line 37, claim 11, after "regulating" insert means comprising; and lines 38 and 39, strike out the words "comprising means"; page 8, line 15, claim 16, for "completeing" read completing; and that the said Letters Patent should be read with these corrections therein that the same may conform to the record of the case in the Patent Office.

Signed and sealed this 14th day of November, A. D. 1933.

F. M. Hopkins (Seal) Acting Commissioner of Patents.